US012393442B2

(12) United States Patent
Patel et al.

(10) Patent No.: US 12,393,442 B2
(45) Date of Patent: Aug. 19, 2025

(54) HARDWARE CO-ORDINATION OF RESOURCE MANAGEMENT IN DISTRIBUTED SYSTEMS

(71) Applicant: QUALCOMM Incorporated, San Diego, CA (US)

(72) Inventors: Piyush Patel, Cary, NC (US); Kevin Mann, Raleigh, NC (US); Theodore Haggis, Raleigh, NC (US); Malvika Singh, Austin, TX (US); Mit Kutchi, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/139,924

(22) Filed: Apr. 26, 2023

(65) Prior Publication Data

US 2024/0078131 A1 Mar. 7, 2024

Related U.S. Application Data

(62) Division of application No. 16/298,419, filed on Mar. 11, 2019, now Pat. No. 11,640,317.

(51) Int. Cl.
*G06F 9/46* (2006.01)
*G06F 9/30* (2018.01)
(Continued)

(52) U.S. Cl.
CPC .......... *G06F 9/468* (2013.01); *G06F 9/30032* (2013.01); *G06F 9/4881* (2013.01);
(Continued)

(58) Field of Classification Search
None
See application file for complete search history.

(56) References Cited

U.S. PATENT DOCUMENTS 6,341,340 B1  1/2002  Tsukerman et al.
6,965,893 B1  11/2005  Chan et al.
(Continued)

FOREIGN PATENT DOCUMENTS

CN  1601510 A  3/2005
EP  1521184 A2  4/2005

OTHER PUBLICATIONS

International Search Report and Written Opinion—PCT/US2020/021870—ISA/EPO—Aug. 13, 2020.
(Continued)

*Primary Examiner* — Qing Yuan Wu
(74) *Attorney, Agent, or Firm* — Muncy, Geissler, Olds & Lowe PC

(57) ABSTRACT

Systems and methods are directed to methods and apparatus for transferring ownership of common resources from a source entity, which owns a resource, to a destination entity, which will own the resource, in a distributed system. The method includes the source entity receiving a command to change ownership (the MOVE command), and then marking the source entity as no longer owning the common resource. The source entity then sends a MOVE command to the destination entity, which will then update its common resource ownership table to reflect that the ownership of the common resource has been transferred from the source entity to the destination entity. It is advantageous that the updating of ownership of the common resource in the source entity occur simultaneously with the dispatching of the MOVE command to the destination entity.

7 Claims, 6 Drawing Sheets

(51) Int. Cl.

| | | |
|---|---|---|
| *G06F 9/48* | (2006.01) | |
| *G06F 9/50* | (2006.01) | |
| *G06F 9/52* | (2006.01) | |
| *G06F 13/16* | (2006.01) | |
| *G06F 9/38* | (2018.01) | |

(52) U.S. Cl.
CPC ............... *G06F 9/52* (2013.01); *G06F 9/524* (2013.01); *G06F 9/526* (2013.01); *G06F 13/1663* (2013.01); *G06F 9/30087* (2013.01); *G06F 9/5005* (2013.01); *G06F 9/522* (2013.01)

(56) References Cited

U.S. PATENT DOCUMENTS

| | | |
|---|---|---|
| 7,162,476 B1 | 1/2007 | Belair et al. |
| 11,640,317 B2 | 5/2023 | Patel et al. |
| 2008/0086603 A1 | 4/2008 | Lahtinen et al. |
| 2009/0052319 A1 | 2/2009 | Muqattash et al. |
| 2012/0271903 A1 | 10/2012 | Luna |
| 2013/0303146 A1 | 11/2013 | Van Voorhees et al. |
| 2014/0267334 A1 | 9/2014 | Duluk, Jr. et al. |
| 2015/0277911 A1 | 10/2015 | Khartikov et al. |
| 2016/0034407 A1 | 2/2016 | Shankar |
| 2017/0090800 A1 | 3/2017 | Alexandrovich et al. |
| 2017/0124171 A1* | 5/2017 | Hastie .................. G06F 16/273 |
| 2018/0032442 A1 | 2/2018 | Turean |
| 2019/0332271 A1 | 10/2019 | Abouelwafa et al. |
| 2020/0004603 A1 | 1/2020 | Gambino |
| 2020/0004672 A1 | 1/2020 | Scott et al. |

OTHER PUBLICATIONS

Jin S., et al., "Secure MMU: Architectural Support for Memory ISOLATION Among Virtual Machines", IEEE/IFIP 41st International Conference on Dependable Systems and Networks Workshops (DSN-W), pp. 1-6, Jun. 27, 2011.

O'Hearn P.W., et al., "Resources, Concurrency and Local Reasoning", May 1, 2007. Theoretical Computer Science 375(1-3), 43 pages, May 2007.

Taiwan Search Report—TW109108065—TIPO—Mar. 25, 2024.

Yoon D.Y., et al., "Distributed Lock Management with RDMA Decentralization without Starvation", Proceedings of the 39th ACM Sigplan Conference on Programming Language Design and Implementation, Society for Computer Simulation Internationalpub1344, San Diego, CA, USA, Jun. 10, 2018-Jun. 15, 2018, May 27, 2018, pp. 1571-1586, XP059200548.

* cited by examiner

HARDWARE CO-ORDINATION OF RESOURCE MANAGEMENT IN DISTRIBUTED SYSTEMS

CROSS-REFERENCE TO RELATED APPLICATIONS

This application is a divisional of U.S. patent application Ser. No. 16/298,419, entitled "Hardware Co-ordination of Resource Management in Distribution Systems," filed Mar. 11, 2019, and assigned to the assignee hereof, the contents of which are hereby incorporated by reference in their entirety.

FIELD OF DISCLOSURE

Disclosed aspects are directed to distributed electronic systems. More specifically, exemplary aspects are directed to sharing resources in distributed electronic systems.

BACKGROUND

As electronic and packaging fields advance more and more, functionality can be squeezed into distributed systems. Because of the large number of independent electronic entities that can be included in distributed systems, it is advantageous that entities share resources, for example, so that functional units are not duplicated needlessly. It is also advantageous that the sharing of resources be done efficiently, for example, so the latency caused by such sharing is reduced.

Accordingly, there is a need for improved management of resource ownership in distributed systems.

SUMMARY

Exemplary aspects of the invention are directed to hardware, systems and methods for managing resources in distributed systems.

In one embodiment a method for use in an exemplary distributed system, which includes a source entity and a destination entity, is disclosed. Each entity in the distributed system has a common resource ownership table that records ownership, i.e. which entity may access a common resource. The resources which are shared by various entities in the distributed system are the common resources as more than one entity may access them, but only one entity may access a common resource at a time. The common resource ownership table records which entities own, i.e. may access, the common resource. The entity that may access the common resource is said to own that resource and any accesses of the common resource are performed by the entity that owns the common resource.

The method includes determining, by a source entity, that ownership of a common resource (the right to access a common resource) in a distributed system is to be transferred to a destination entity. The method further includes updating the common resource ownership table, of the source entity, to reflect that the source entity no longer owns the common resource; and then sending a MOVE command to another entity within the distributed system reflecting that the common resource ownership has been changed from the source entity to the destination entity.

In another embodiment a method of controlling access to a common resource in an exemplary distributed system is disclosed. The method includes generating, by a non-source entity (an entity that does not own the common resource), a request to access the common resource. The method further includes transmitting the access request to a source entity, generating an access of the common resource by the source entity; and directing a result of the access of the common resource to the non-source entity.

In a further embodiment a method of transferring ownership of a common resource in an exemplary distributed system in which a source entity, which owns the common resource, is not known by an originating entity is disclosed. The originating entity which is the entity that generates the access request for access of a common resource), is requesting the transfer of ownership but is not the source entity. The method includes accepting of a MOVE command by a non-source originating entity having a common resource ownership table, examining, by the originating entity, of the common resource ownership table to determine which entity owns the common resource; and sending a MOVE command from the originating entity to the source entity indicating that the transfer of ownership of the common resource from the source entity to a destination entity is requested.

In a further embodiment a method of transferring ownership of a common resource in an exemplary distributed system when a source entity, which owns the common resource, does not have a common resource ownership table, is disclosed. The method includes the accepting of a MOVE command by an entity not having a common resource ownership table, noting, by the entity not having a common resource ownership table, that it no longer owns the common resource, and sending a MOVE command from a non-source entity to at least one other entity indicating that the transfer of ownership of the common resource from the source entity to a destination entity is indicated.

In a further embodiment a method of forwarding an access request and common resource ownership from a source entity to a destination entity in an exemplary distributed system is disclosed. The method includes receiving, at the destination entity, an indication that the ownership of a common resource is to be moved from the source entity to the destination entity; and examining a source entity command queue to determine if there is an access request of the common resource for the destination entity and a MOVE command transferring ownership of the common resource to the destination entity. If both the MOVE command and the access request are present insuring that the MOVE command reaches the destination entity prior to the access request reaching the destination entity.

An apparatus for transferring common resource ownership in an exemplary distributed system is disclosed. The apparatus includes an input for receiving, by a source entity an indication that ownership of a common resource is to be transferred, a common resource ownership table for updating the ownership by the source entity to reflect that the source entity no longer owns the common resource, and circuitry for sending a MOVE command to another entity within the distributed system reflecting the change of the common resource ownership has been changed from the source entity to a destination entity.

In a further embodiment an exemplary apparatus for controlling access to a common resource in a distributed system is disclosed. The apparatus includes circuitry configured to generate, by a non-source entity, a request to access the common resource, circuitry configured to transmit the access request to a source entity, circuitry configured to generate an access of the common resource by the source entity; and circuitry configured to directing a result of the access of the common resource to the non-source entity.

In a further embodiment an apparatus for transferring ownership of a common resource in an exemplary distributed system when a source entity, which owns the common resource, is not known by an originating entity requesting the transfer of ownership is disclosed. The apparatus includes circuitry configured to accept a MOVE command by a non-source originating entity having a common resource ownership table, circuitry configured examining, by the non-source entity, of the common resource ownership table to determine which entity owns the common resource; and circuitry configured to send a MOVE command from the non-source entity to the source entity indicating that the transfer of ownership of the common resource from the source entity to a destination entity.

In a further embodiment an apparatus configured to transfer ownership of a common resource in an exemplary distributed system when the source entity, which owns the common resource, but does not have a common resource ownership table, is disclosed. The apparatus includes source entity circuitry configured to accept a MOVE command, an indicator as to whether the source entity owns the common resource or not, source circuitry configured to note whether the source entity owns the common resource or not; and circuitry configured to send a MOVE command from a non-source entity to at least one other entity indicating that the transfer of ownership of the common resource from the source entity to a destination entity has occurred.

In a further embodiment an apparatus configured to forward an access request and common resource ownership from a source entity to a destination entity is disclosed. The apparatus includes circuitry configured to receive, at the destination entity, an indication that ownership of a common resource is to be moved from the source entity to the destination entity, a source entity command queue for storing commands for the source entity prior to executing them, and circuitry configured to examine the source entity command queue to determine if there is an access request of the common resource for the destination entity and a MOVE command transferring ownership of the common resource to the destination entity, and if both the MOVE command and the access are present, circuitry to ensure that the MOVE command reaches the destination entity prior to the access request reaching the destination entity.

In a further embodiment an apparatus configured to transfer common resource ownership in an exemplary distributed system is disclosed. The apparatus includes means for receiving, by a source entity an indication that ownership of a common resource is to be transferred, means for updating the ownership by the source entity to reflect that the source entity no longer owns the common resource; and means for sending a MOVE command to another entity within the distributed system reflecting the change of the common resource ownership has been changed from the source entity to a destination entity.

In a further embodiment a non-transitory computer-readable storage medium comprising code, which, when executed by a processor, causes the processor to perform operations for managing resource ownership in an exemplary distributed system, is disclosed. The code contained in the non-transitory computer-readable storage medium includes code for receiving, by a source entity an indication that ownership of a common resource is to be transferred, code for updating the ownership by the source entity to reflect that the source entity no longer owns the common resource, and code for sending a MOVE command to another entity within the distributed system reflecting the change of the common resource ownership has been changed from the source entity to a destination entity.

BRIEF DESCRIPTION OF THE DRAWINGS

The accompanying drawings are presented to aid in the description of aspects of embodiments of the invention and are provided solely for illustration of the aspects and not limitation thereof.

DETAILED DESCRIPTION

Figure 1:
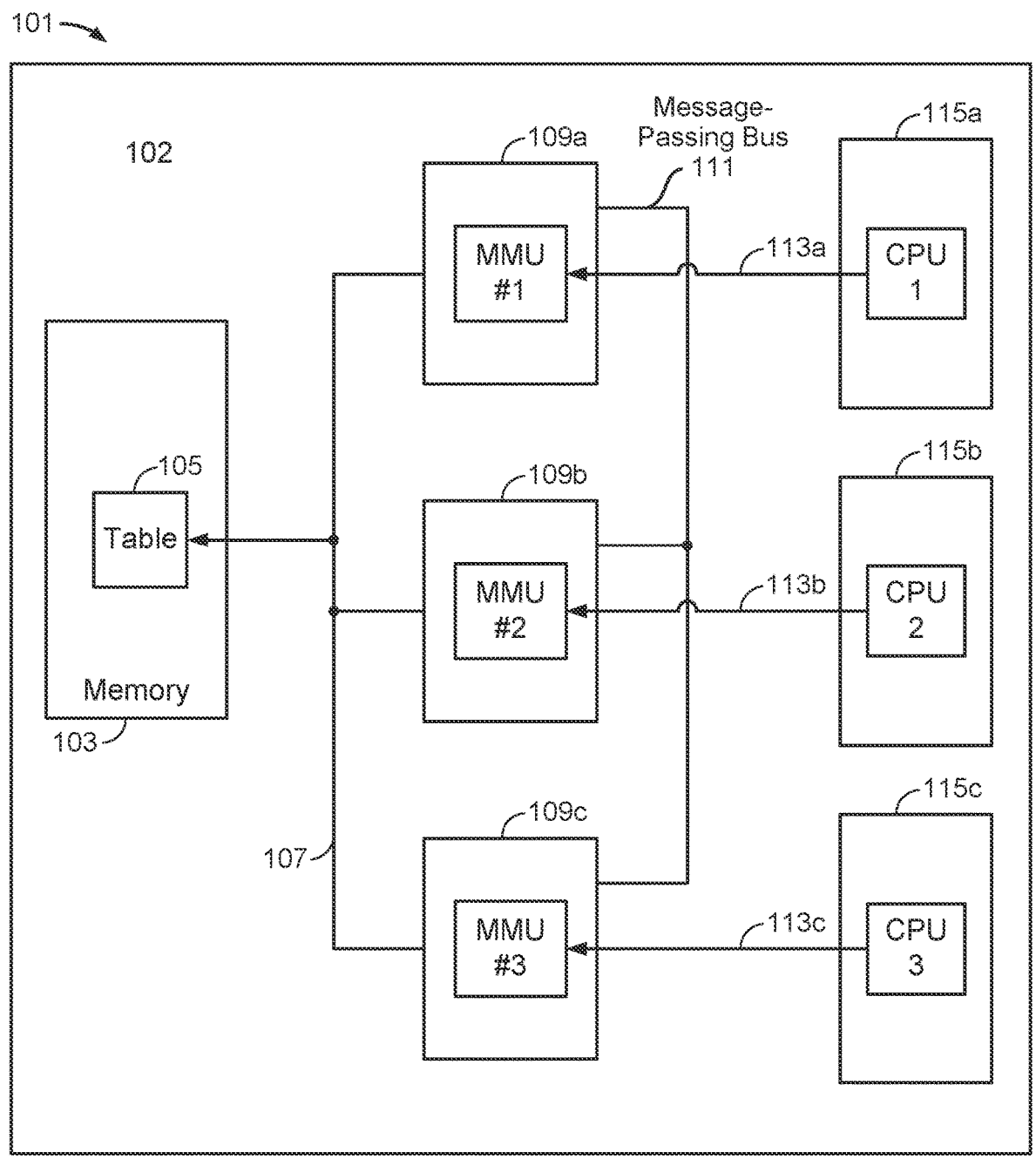
FIG. 1 is a graphic illustration of a simple exemplary distributed system.

Aspects of the invention are disclosed in the following description and related drawings directed to specific aspects of the invention. Alternate aspects may be devised without departing from the scope of the invention. Additionally, well-known elements of embodiments of the invention will not be described in detail or will be omitted so as not to obscure the relevant explanatory details of the teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

For the purpose of this disclosure, a distributed system contains, but is not limited to, electronic entities (entities) that comprise, but are not limited to, an input for receiving information, an output for conveying information and a message-passing mechanism for communicating with other entities. The input for receiving information and the output for communicating with other entities, as well as the message-passing bus may actually be the same physical connection, for example, a serial or parallel bus serving as both an input and an output, but they need not be.

For the purposes of this disclosure, a shared resource (resource) is defined as a shared device, e.g., a memory table, a floating point unit, an input/output unit, a register or the like, which is used by different entities at different times, for example, a shared resource may be accessed by different threads in a multi-threaded computing environment.

For the purposes of this disclosure, an owner is defined as the singular, chosen access controller which serves as the gateway to a shared resource. Ownership (and non-ownership) may be contained within an entity in a common resource ownership table (though it need not be) so that the entity can know if it may access the shared resource. Once the shared resource is owned, the owner entity can access or grant access to the shared resource.

For the purposes of this disclosure, an access is defined as any operation which requires communication, e.g. a write to or a read from a common resource.

For the purposes of this disclosure, a MOVE command is a command that transfers ownership of a shared resource from one entity to another. The MOVE command includes an identification of a common resource and an identity of the entity to which the common resource ownership is to be moved to, though it may contain other information as well.

For the purposes of this disclosure, a source entity is an entity that owns a common resource.

For the purposes of this disclosure, a destination entity is an entity that the ownership of a common resource will be transferred to.

For the purposes of this disclosure, an origination entity is the non-source and non-destination entity in which a MOVE instruction may originate.

For the purposes of this disclosure, a common resource ownership table (aka common resource table, common ownership table, and resource ownership table) is a listing of entities which entity currently owns a common resource.

FIG. 1 is a graphic illustration of a simple exemplary distributed system. Generally, a distributed system is a system in which computing resources are decentralized into a plurality of entities which cooperate to function properly. Such cooperation is commonly accomplished by having a mechanism to pass messages between the entities. The system of FIG. 1 is an example of a simple distributed system. FIG. 1 shows element 101, an exemplary portion of a distributed system, comprising various semiconductor dies, 103, 109 a, 109b, 109c 115a, 115b and 115c on a carrier substrate 102. In FIG. 1, three CPU (Central Processing Unit) dies, 115a, 115b, and 115c, are coupled to three memory management unit dies, 109a, 109b, and 109c by three interconnection buses 113a, 113b and 113c, respectively. The three memory management units' dies 109a, 109b, and 109c are further coupled to a memory die 103 via a memory bus 107. Memory die 103 contains table 105 which the three CPU dies 115a, 115b, and 115c will access. Since there is only one table 105, the CPU dies 115a, 115b, and 115c must take turns accessing the table 105. Access to the table 105 is mediated over a message-passing bus 111. Memory management unit dies 109a, 109b, and 109c use the message-passing bus 111 to share ownership and transfer ownership of the table 105. One way to control ownership (permission to read from or write to a common resource which may be used by a plurality of entities) is to maintain within each entity an ownership table which lists each entity and which entity owns the common resource and is therefore permitted to access that common resource. Herein such a table is referred to as a common resource ownership table. Only the owner of table 105, the source entity, may access it at a given time, so access to the table 105 is managed using the message-passing bus 111. Such message-passing "bus" may be a serial or parallel bus as illustrated by the message-passing bus 111, or it may be a virtual channel of some sort. Any mechanism that can convey messages between entities is considered herein to be a message-passing "bus."

When multiple entities, such as the memory management unit dies 109a, 109b, and 109c, are reading from and writing to a common resource, such as table 105, there exists a possibility that the system may be slowed as one memory management entity may have to wait for another to finish with the common resource. If the time waiting for a common resource becomes excessive, system performance can be slowed. Accordingly, it is advantageous to switch resource ownership quickly. However, switching ownership quickly may cause race conditions and resource corruption if one entity corrupts the data of another entity, for example, if data destined for one entity is interpreted by a second entity as belonging to the second entity or in the case of a race condition in which more than one MMU 109 attempts to access table 105 at the same time. Decreasing the time allotted to switching resource ownership will likely increase the possibility of race conditions between the entities, when two or more entities want to access the common resource at the same time, which can worsen the problem of resource corruption The example distributed system, illustrated in FIG. 1, is an example of one distributed system. A virtual infinite number of different distributed systems can be designed. The present example is included to give a concrete, easily understandable example of a system in which a plurality of entities cooperate through a message-passing bus 111 in order to access a common resource, table 105.

Figure 2:
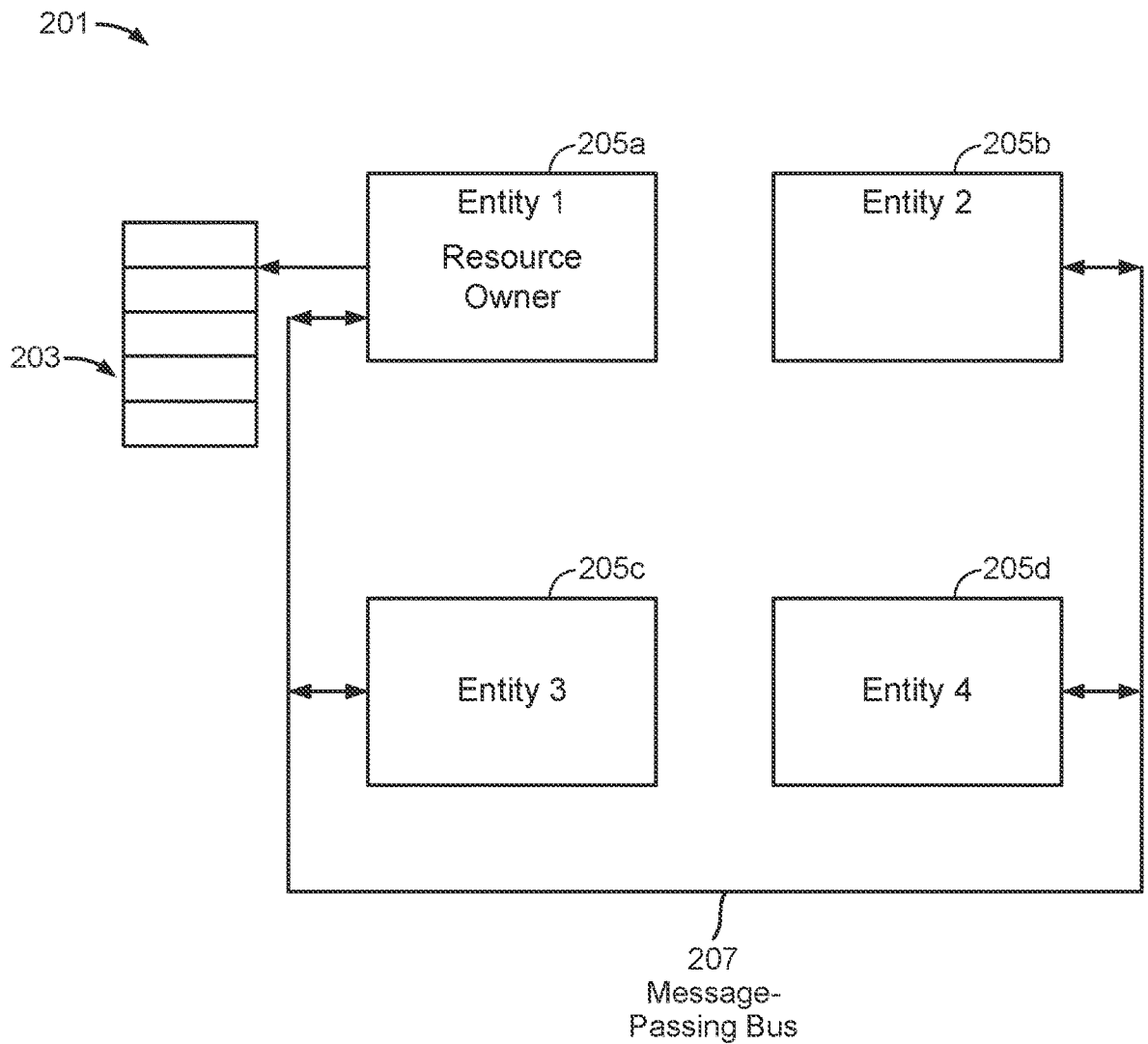
FIG. 2 is a graphical representation of a portion of an illustrative distributed system.

FIG. 2 is a graphical representation of a portion of another illustrative distributed system 201. In distributed system 201, a memory table 203 will be written to and read from by four computing entities: entity 1 (205a), entity 2 (205b), entity 3 (205c), entity 4 (205d). The entities 205a-d communicate with each other via a message-passing bus 207, which may be any type of communication channel known in the art such as a serial bus, a parallel bus or a virtual channel or the like, which is capable of passing messages between the entities.

In FIG. 2, entity 1 (205a) initially owns memory table 203. However, memory table 203 is a commonly owned resource whose information may be pertinent to all entities 205a-d in the illustrative distributed system 201. If entity 1, 205a, is the owner of the commonly owned resource, memory table 203, then none of the other entities 205b-d are allowed to access memory table 203. If an entity requires access from memory table 203 it can forward the access request to the resource owner entity 1 (205a), because entity 1 (205a) owns the memory table 203 and commonly no other simultaneous access to the memory table 203 is allowed, for example, in order to prevent data coherency problems. For the purposes of this example, only the owner of a resource, i.e., the source entity, will access that resource and if other entities require data that is in the common resource, they will secure access by submitting an access request to the common resource to the current resource owner.

System software (not illustrated) may dictate a change of ownership of a common resource. There are many cases where such a transfer of ownership can improve system performance.

The transfer of ownership of a resource from one entity to another may cause memory coherency problems, for example, if two entities attempt to write to the same location in the memory table 203 simultaneously. Such a situation is commonly referred to as a race condition. Race conditions may be difficult to solve because such race conditions may corrupt data intermittently depending on a variety of factors. Accordingly, it is advantageous to prevent such race conditions by ensuring that only the owner of a resource can access that resource.

One simple, but effective, method of avoiding a race condition while transferring ownership is to stall the entities in the system. In other words when a change of ownership of a common resource is needed, race conditions can be avoided by simply stopping all entities from accessing, e.g. reading from or writing to the common resource, until the transfer of ownership is completed. This method of course has obvious drawbacks in that all accesses of common resources are stopped whether or not it is necessary to do so.

Figure 3:
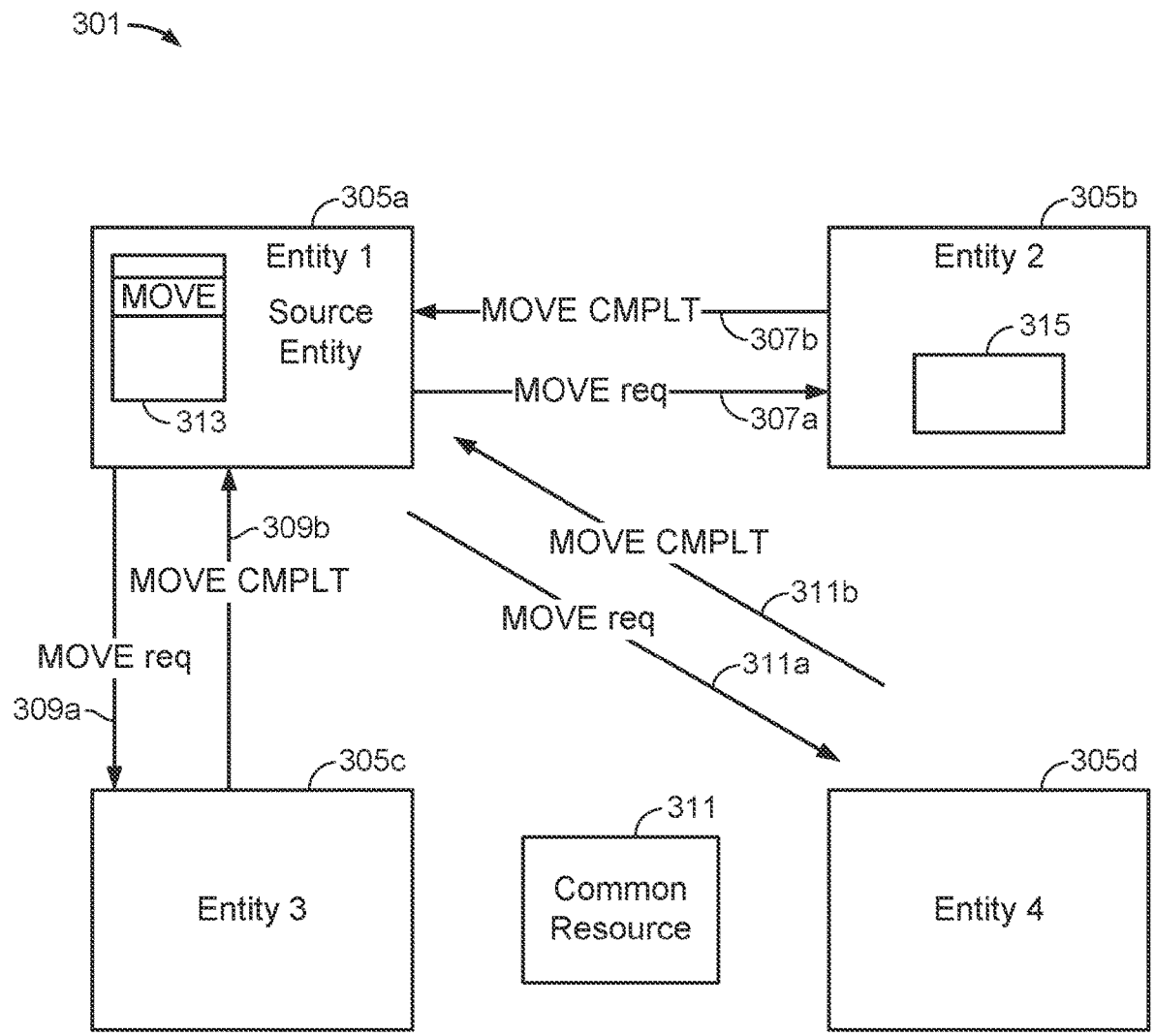
FIG. 3 is a graphical illustration of a transfer of resource ownership between entities.

FIG. 3 is a graphical illustration of a transfer of resource ownership between entities. This method of a transfer of resource ownership solves the above-described race condition without the inefficiency of stalling the entities in the system. In FIG. 3, entities 1 through 4 (305a through 305d respectively) are entities that all may desire access to a common resource 311. The entities 305a-d pass messages to each other over a message bus of any suitable type (not shown) in order to share access to the common resource 311 by transferring ownership of the resource.

The first step in the transfer of ownership, of the resource to be transferred, e.g. common resource 311, is for the source entity (which owns the resource) to update its ownership in its common resource ownership table 313. A common resource ownership table, such as 313, is a list of entities in a system and what common resources are owned (able to be accessed) by each entity in the system. Each entity may contain a common resource ownership table with the same information. The common resource ownership table 313 will be updated to reflect that source entity 1 (305a) is giving up ownership to the destination entity 305b (i.e., entity 2). It is helpful in avoiding race conditions for the source entity to update its common resource ownership table, before any other entity updates their common resource ownership table. Each of the entities 305a-d in FIG. 3 has a common resource ownership table, similar to common resource ownership table 313, which records which entity currently owns which resource. The common resource ownership tables in entities 3 and 4 are not shown to avoid cluttering FIG. 3 needlessly. Entity 1 (305a) in the present example owns the common resource 311. To transfer ownership of the common resource 311, entity 1 (305a) updates its common resource ownership table 313 to reflect the fact that it is no longer the owner of the common resource 311, and the destination entity 305b is the new owner. Now any access requests for the common resource 311 coming to entity 1 (305a) will be forwarded to the new owner as reflected in entity 1's (305a) common resource ownership table 313.

Entity 1 (305a) then sends a MOVE command 307a to the destination entity 305b which will become the new owner of the common resource 311 once it can act on the command and update its common resource ownership table 315. A MOVE command is also sent to the other entities in the system (e.g. 309a and 311a) so that their common resource ownership tables can be properly updated with new ownership of the common resources. The changing of ownership should be as close to an atomic operation as possible, that is, a change in ownership which is reflected in the common resource ownership table should take place simultaneously with the sending of the MOVE commands to other entities (e.g., 307a, 311a, and 309a). However if such an atomic operation is not possible for some reason, a change in ownership should be reflected in the source entity's common resource ownership table before the MOVE command is acted on by any other entity, to ensure "thread safe" operation and thereby ensure that one thread will not corrupt another thread's data, Once each entity has changed its common resource ownership table, it may report back to the source entity that the MOVE command has been executed, e.g., 307b, 309b and 311b can report that their common resource ownership tables have been updated.

Figure 4:
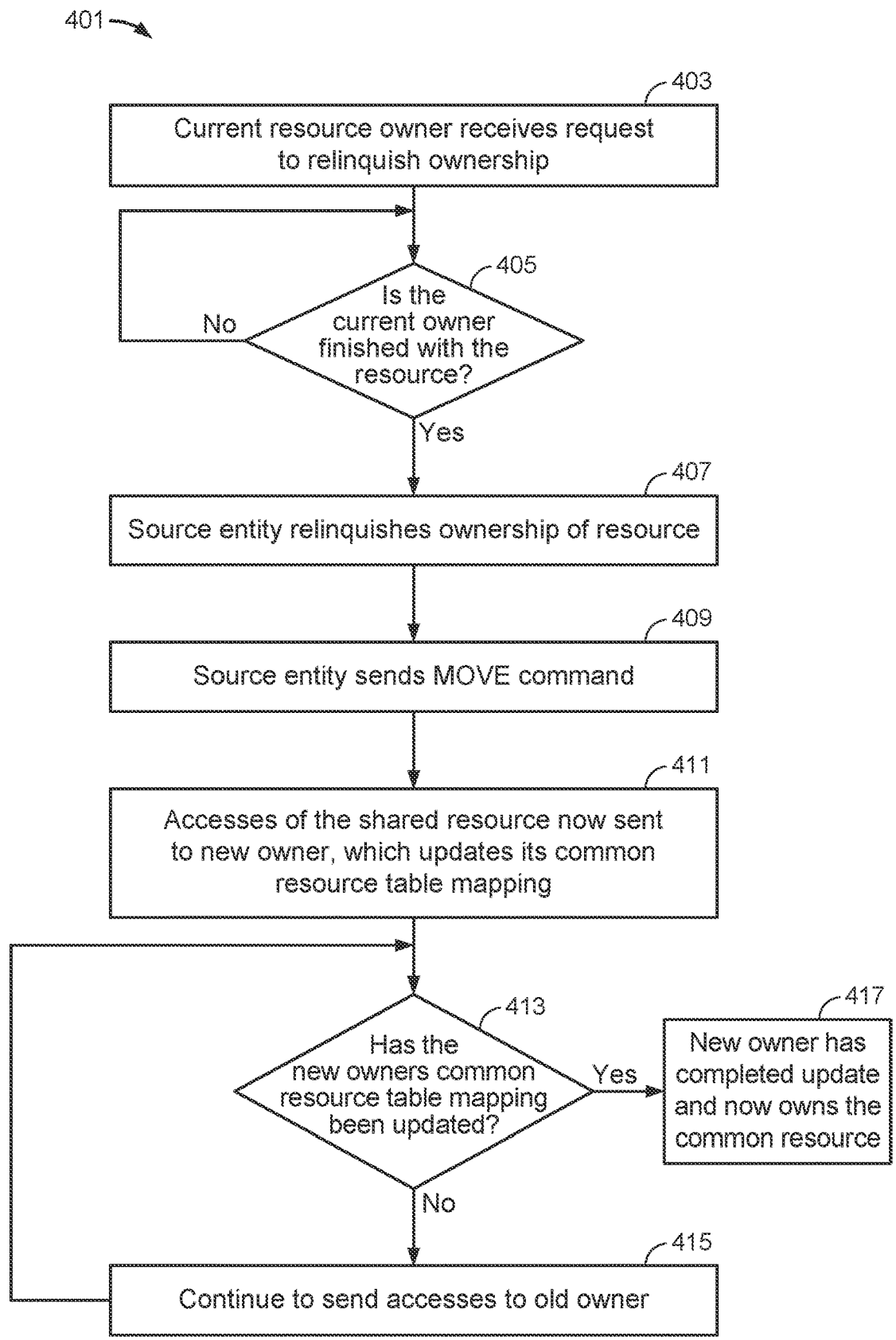
FIG. 4 is a flow chart illustrating the transfer of resource ownership between entities.

FIG. 4 is a flow chart illustrating the transfer of resource ownership between entities shown generally at 401.

In block 403, the source entity 305a which currently owns a common resource 311 receives a MOVE command 307a from another entity, e.g., 305b, the destination entity. Next decision block 405 is executed.

In decision block 405, the source entity 305a determines whether accessing the common resource 311 has completed. If source entity 305a is not has not completed accessing the common resource 311, block 405 will continue to be executed. If source entity 305a is finished with common resource 311, execution will pass to block 407.

In block 407, the source entity 305a relinquishes ownership of the common resource 311 by updating its common ownership resource table 313 to reflect the fact that the destination entity 305b owns the common resource 311. One way to control ownership is to maintain within each entity an ownership table which lists each common resource and which entity owns the common resource and is therefore permitted to read from and/or write to (i.e. access) that common resource. In simpler systems, for example, an entity that accesses only one common resource, the common resource ownership table may be replaced by an indicator as to whether the entity owns the common resource or not. In the more complex present exemplary system, the source entity 305a relinquishes ownership by noting, in its common resource ownership table 313, that the common resource 311 is owned by the destination entity 305b. Then control passes to block 409.

In block 409 the source entity 305a sends a MOVE command (also known as a MOVE command) to the destination entity 305b block 411 is executed next.

In block 411, the destination entity 305b receives the MOVE command and then updates its internal common resource ownership table to reflect the fact that it is now the owner of the common resource 311. Block 413 is executed next.

In block 413, the destination entity 305b checks its common resource ownership table to determine if it now owns the common resource 311. If the destination entity 305b does not own the common resource 311, block 415 is executed next.

In block 415, the destination entity 305b will forward any access requests coming to it from the common resource back to the source entity and block 413 will be executed next.

Of course if the source entity 305a receives any data from the common resource it will check its common resource table 313 and once it determines that its common ownership resource table says that the common resource belongs to the destination entity 305b, it will forward the data to the destination entity 305b. This ping ponging between blocks 413 and 415 will be broken in block 413 when the common resource ownership table 315 of the destination 305b is updated so that the destination entity 305b is the owner of common resource 311. Then 417 will be executed next.

In block 417, the destination entity 305b has ownership of the common resource 311, as reflected in its common resource ownership table 315 and the destination entity 305b may proceed to access the common resource 311.

Figure 5:
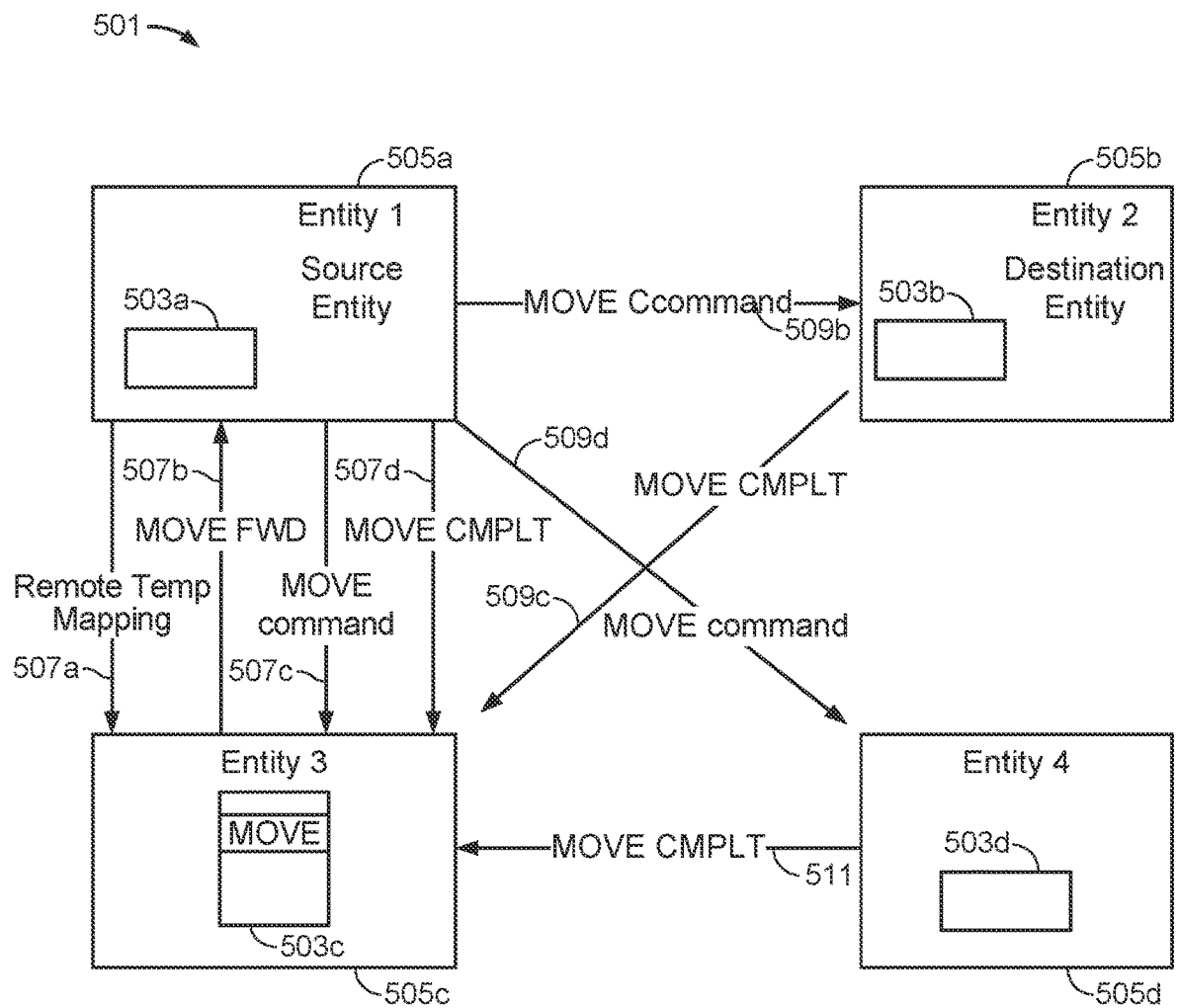
FIG. 5 is a graphical representation of a portion of an illustrative distributed system.

FIG. 5 is a graphical representation of a portion of an illustrative distributed system 501. Commonly, software running in a distributed system is aware of which entity owns a particular common resource. In FIG. 5, the case is represented where software, which is executing in a first entity in a distributed system is not aware of which entity owns a particular common resource. In such a case, the MOVE command can be sent to a second entity, for example over a message passing bus which couples the first entity to the second entity. If the second entity does not own the common resource, which is the subject of the MOVE command the second entity, which received the MOVE command, will attempt to forward it to the entity that owns the particular common resource. If the second entity, which receives the MOVE command, does own the common resource, the second entity will execute the MOVE command and relinquish ownership of the common resource.

In the graphical representation of FIG. 5, four entities are shown: 505a, 505b, 505c, and 505d. Each entity has a common resource ownership table 503a, 503b, 503c, and 503d, respectively.

Assume, for the sake of illustration, that a MOVE command is sent to entity 3 (505c), which is not the current owner of the common resource whose ownership will be moved. Entity 3 may be referred to as the origination entity since that is where the MOVE command was initially sent to, i.e., originated. Assume entity 1 (505a) is the entity that owns the common resource, i.e., the source entity. Entity 3 should not be the first to change its mapping in its common resource ownership table 503c. Once entity 3 (505c), the origination entity, examines its common resource ownership table 503c, it will determine that (for example) entity 1 (505a) is the current owner (source entity) of the common resource whose ownership will be moved. Entity 3 (505c) will then send a MOVE FWD request 507b to entity 1 (505a). Once entity 1 receives the MOVE FWD request 507b, it can update its common resource ownership table 503a to reflect the move of the transfer of ownership of the common resource to the destination entity 505b. Subsequently, once entity 1 (505a) has updated its common resource ownership table 503a, entity 1 (505a) can then send MOVE commands to entities 2, 3, and 4 as shown at 509b, 507c, and 509d so that they may update the ownership of the transferred resources in their common resource ownership tables 503b, 503c and 503d. Once entities 2, 3, and 4 have updated their common resource tables they can send MOVE CMPLT (MOVE complete) commands (509c, 511, and 507d) back to the entity that was the source of the MOVE command, in this example entity 3 (505c). Once entity 3 (505c), which requested the ownership change request, receives MOVE CMPLT commands (509c, 511, and 507d) from the other entities in the distributed system, it can notify the software that the requested change in common resource ownership has been completed.

In certain cases there may be entities that have no need to own certain common resources, and in some cases may not even possess a common resource ownership table. For example, an entity that only accesses a printer will not require a resource ownership table. The entity simply needs an indication as to whether it currently owns the printer or not. Such entities may respond to a move command by sending a "dummy" MOVE CMPLT command to the entity which requested the move, in the present example entity 3 (505c).

An example scenario where the source entity does not have a common resource ownership table may occur, for example, if an entity accesses only one common resource and has no access to other common resources. Just as in the example above, where an entity accesses only a single common resource, a printer, there may be entities within a system which do not have a common resource ownership table as they access a single common resource. An entity need not track a common resource it does not use.

For example, assume that the source entity is entity 1 (505a) and that common resource ownership table 503a does not exist. A mechanism is needed to handle this situation. Again entity 3, 505c, the origination entity, receives a MOVE command and then forwards it on to the source entity, entity 1 (505a). Even though entity 1 (505a) has no common ownership resource table, as the source entity, it can still co-ordinate the ownership transfer. Once the source entity 505a receives the MOVE command from the requesting entity 505c, the source entity 505a can mark the common resource as no longer available to it and create a temporary mapping (not shown). Then the source entity 505a can send out MOVE commands (e.g., 509b, 509d and 507c). Once the requesting entity 505c receives all the MOVE CMPLT commands (509c, 511 and 507d) from all the other entities in the system it can then inform the source entity 505a that the resource ownership transfer is complete and send a REMOVE TEMP command 507a to the source entity 505a to indicate the transfer of ownership has been accomplished, and entity 1 (505a) may remove the temporary resource mapping table. The temporary resource mapping table in this case may record the entities in the system and whether they have responded to MOVE commands (e.g. 509b, 509d and 507c) and have sent MOVE CMPLT commands (509c, 511 and 507d) to the source entity and the originator entity if appropriate.

Figure 6:
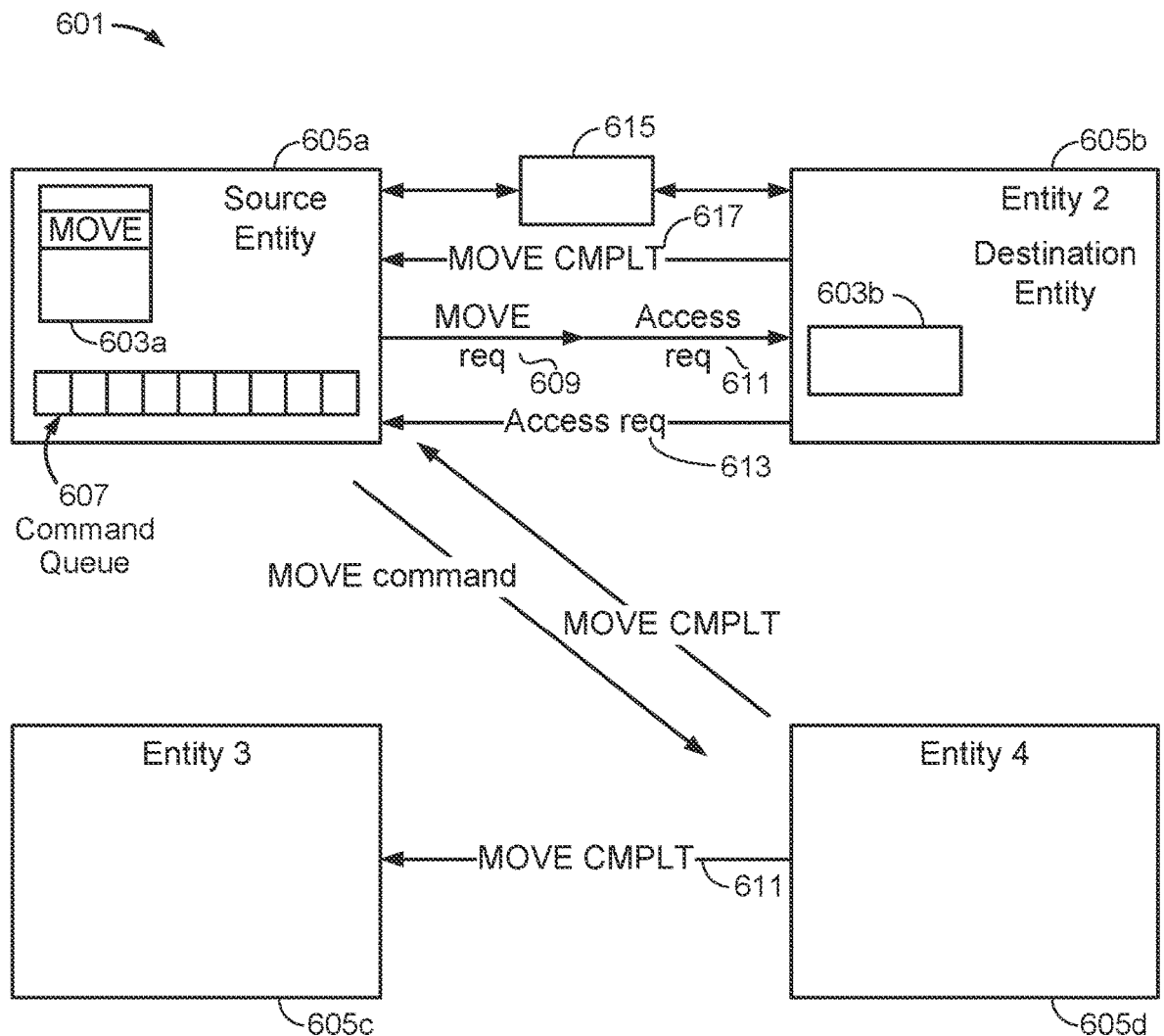
FIG. 6 is a graphical representation of a portion of an illustrative distributed system.

FIG. 6 is a graphical representation of a portion of an illustrative distributed system, 601. In FIG. 6, four entities are illustrated: entity 1 (605a), entity 2 (605b), entity 3 (605c) and entity 4 (605d).

Entity 1 (605a) is the source entity. Entity 1 (605a) contains a command queue 607. The command queue 607 contains commands for entity 1 (605a) to execute, such as transmit commands, which may be out of order.

Assume, as in the FIG. 5, for example, that entity 1 (605a) receives an access request for a common resource that will be completed by entity 2 (605b). Assume further that common resource ownership table 603a indicates that entity 1 (605a) is the current owner of the resource to be accessed by entity 2 (605b). At some point, we can assume that entity 1's (605a) command queue 607 will contain an access request 611, to a commonly owned resource 615, for entity 2 (605b). Entity 1 (605a) knows that it must pass the access request 611 to entity 2 (605b). At some point entity 1 (605a) will also determine that it, entity 1, is the owner of the commonly owned resource 615 and generate a MOVE command 609 to move the ownership of the commonly owned resource 615 to entity 2 (605*b*). It is entirely possible that the access request 611 may be scheduled to transmit to entity 2 (605*b*) prior to MOVE command 609. If the access request 611 arrives at entity 2 (605*b*) before the MOVE command 609, then entity 2 (605*b*) the destination will simply forward the access request 611 back to entity 1 (605*a*) as shown at 613. However, if entity 1 (605*a*) can detect that it will be sending both an access request 611 and a MOVE command 609 for a commonly owned resource 615 to a common entity, it will be more efficient to send the MOVE command 609 first.

If the access request 611 is sent to the destination entity 605*b* prior to the MOVE command 609 being sent to the destination entity 605*b*, the destination entity 605*b* may examine its common resource ownership table 603*b* and determine that the common resource 615 is owned by source entity 605*a* and forward 613 the access request 611 to a previous owner of the commonly owned resource 615, in this case the source entity 605*a*. However, if the MOVE request 609 is sent from the source entity 605*a* prior to sending the access request 611 the destination entity 605*b* will update its common ownership resource table before getting the access request 611. The destination entity 605*b* will determine that it owns the common resource 615 and it is free to access the common resource 615.

In the case that the access request 611 is sent to the destination entity 605*b* prior to the MOVE command 609 the access request 611 is forwarded at 613 back to the source entity 605*a*, the source entity 605*a* will examine its common resource ownership table 603*a* and then forward the access request 611 back to the destination entity 605*b*, i.e., entity 2. Accordingly, if entity 1 (605*a*) detects that there is both a MOVE command 609, transferring the ownership of a common resource to a destination entity 605*b*, and a command that is an access request 611 for the common resource on behalf of the destination entity 605*b* in the command queue 607, it will be advantageous for entity 1 (605*a*) to ensure that the MOVE command 609 is sent and arrives at the destination entity 605*b* before the access request 611 arrives at the destination entity 605*b*, which will ensure the destination entity 605*b* has already updated its common resource ownership table 603*b*. Once the ownership of the common resource 615 has been relinquished by source entity 605*a* and that the destination entity 605 updates its common resource ownership table 603*b* the destination entity 605*b* owns the common resource. Once the destination entity 605*b* owns the common resource 615 it will complete the access request 611 and no longer forward the access request at 613.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable non-transitory media embodying a method for managing allocation of a cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of controlling access to a common resource in a distributed system, the method comprising:
    transmitting, from a source entity to a destination entity, an indication that the ownership of a common resource is to be moved from the source entity to the destination entity;
    generating, by a non-source entity, a request to access the common resource, wherein the non-source entity is not a current owner of the common resource;
    transmitting, by the non-source entity, the access request to the source entity;
    generating an access of the common resource by the source entity; and
    forwarding, by the source entity, the access request to the destination entity subsequent to transmitting the indication,
    wherein the source entity, the non-source entity, and the common resource are implemented in hardware as dies.

2. The method of claim 1, wherein transmitting the access request to the source entity further comprises sending the access request via a message-passing bus.

3. The method of claim 2, wherein the message-passing bus physically connects the source entity and the non-source entity.

4. The method of claim 1,
    wherein only an owner of the common resource is allowed to access the common resource, and
    wherein the ownership of the common resource is transferable between the source entity and the non-source entity.

5. The method of claim 1, wherein the source entity, the non-source entity, and the common resource are all formed on a carrier substrate.

6. The method of claim 1,
wherein the source entity includes a common resource ownership table associated with the source entity,
wherein the non-source entity includes a common resource ownership table associated with the non-source entity, and
wherein the method further comprises:
the source entity maintaining its common resource ownership table with information on ownership of the common resource; and
the non-source entity maintaining its common resource ownership table with information on ownership of the common resource.

7. The method of claim 6, wherein when the ownership of the common resource changes from the source entity to another entity, the source entity updates its common resource ownership table before the another entity updates its common resource ownership table.

\* \* \* \* \*